United States Patent
Lee et al.

(10) Patent No.: US 7,636,398 B2
(45) Date of Patent: *Dec. 22, 2009

(54) ADAPTIVE CHANNEL EQUALIZER AND METHOD FOR EQUALIZING CHANNELS THEREWITH

(75) Inventors: Kyu-Man Lee, Suwon-si (KR); Jun Ling Zhang, Suwon-si (KR); Masaki Sato, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 637 days.

This patent is subject to a terminal disclaimer.

(21) Appl. No.: 11/293,978

(22) Filed: Dec. 5, 2005

(65) Prior Publication Data
US 2007/0127582 A1     Jun. 7, 2007

(51) Int. Cl.
*H04L 27/28* (2006.01)
(52) U.S. Cl. ........................ 375/260; 375/229
(58) Field of Classification Search .......... 375/229, 375/232, 233, 316, 346, 260
See application file for complete search history.

(56) References Cited

U.S. PATENT DOCUMENTS

| 2003/0182106 A1* | 9/2003 | Bitzer et al. ............... 704/207 |
| 2004/0218519 A1 | 11/2004 | Chiou et al. ............... 370/203 |
| 2005/0265490 A1* | 12/2005 | Sestok et al. ............... 375/340 |
| 2006/0146690 A1* | 7/2006 | Zhang et al. ............... 370/203 |

FOREIGN PATENT DOCUMENTS

| JP | 2004-153831 | 5/2004 |
| KR | 2000-0018811 | 4/2000 |

* cited by examiner

*Primary Examiner*—Kevin M Burd
(74) *Attorney, Agent, or Firm*—F. Chau & Assoc., LLC (57) ABSTRACT

A channel equalizer obtains channel impulse responses (CIRs) for all subcarriers by way of filtering channel impulse responses of specific subcarriers using at least two filters. One of the two filters may be a low pass filter. At least one other of the at least two filters is implemented as a band pass filter having a variable filtering bandwidth, being available to establish various filtering bandwidths in response to various multi-path channel environments. By improving the performance of channel estimation, equalization may be improved.

15 Claims, 9 Drawing Sheets

ADAPTIVE CHANNEL EQUALIZER AND METHOD FOR EQUALIZING CHANNELS THEREWITH

BACKGROUND

This disclosure relates to receivers for orthogonal frequency division multiplex (OFDM) modulation and more particularly, to a channel equalizer capable of reducing multipath channel noise.

Orthogonal frequency division multiplex (OFDM) modulation is a digital modulation transmission method using multiple carrier frequencies (e.g., in the environment of wireless (or mobile) communications), that is strongly immune against multi-path and fading channels. The OFDM modulation also has excellent spectrum efficiency, so it is being widely used and considered for various wireless communications. For example, the OFDM technique is being advantageously employed in receivers for European digital video broadcasting televisions (DVB-T).

In a wireless transmission path along which a signal sent from a transmission station arrives at a receiver through space, a radio wave is usually reflected on or scattered by spatial impediments such as large constructions, or mountains. Because of that, the receiver may further receive radio waves (i.e., indirect waves) reflected on such obstacles, in addition to a wave signal received directly from the transmission station, i.e., a direct wave signal. The reflected and direct waves are usually received at different times at the receiver, affecting the demodulation process in the receiver. As a result, the receiver may be demodulating an additively distorted signal, not the originally transmitted signal.

It is desirable to reduce the effects of the noise in a multi-path channel communication environment by modifying the receiver. Thus, a typical receiver used therein employs an equalizer to compensate for distortion caused by the aforementioned multi-path channel effect. The equalizer is typically designed having an adaptive function that follows variations of transmission path environments without a fixed operational characteristic.

Meanwhile, a coherent OFDM receiver usually has an equalizer that estimates sub-channels to compensate for the distortion of the channel and adopts the inverse of the characteristic of each of the estimated sub-channels as equalizing coefficients. However, it is difficulty to correctly estimate channels due to delay times of signals received by an OFDM receiver through multi-path channels.

SUMMARY OF THE INVENTION

An aspect of the present invention provides a channel equalizer for an OFDM receiver capable of improving the accuracy of channel estimation.

Another aspect of the present invention provides a method for equalizing and/or estimating channels in an OFDM receiver having a channel equalizer, thus improving the accuracy of channel estimation.

An aspect of the invention provides a method for equalizing channels, comprising the steps of: receiving OFDM symbols; generating channel impulse responses in the frequency domain for specific subcarriers of the OFDM symbols; filtering the channel impulse responses for the specific subcarriers using at least two filters; and estimating channel impulse responses for all subcarriers from outputs of the two filters.

In this embodiment, in the step of estimating the channel impulse responses (CIRs), a channel impulse response (CIR) for a k'th subcarrier of an l'th OFDM symbol is given by:

$$CIR_{l,est}(k) = \sum_{p=-L}^{L} \hat{R}_l(k+p|(k+p) \in P_{SP}) \cdot$$

$$(w^*_{cmplxLPF}(p) + w^*_{cmplxBPF}(p) \cdot e^{-j2\pi nk/N}),$$

where: $\hat{R}_l(k|k \in P_{SP})$ represents samples of the channel impulse response (in the frequency domain) for the k'th subcarrier of the l'th OFDM symbol; $w_{cmplxLPF}(p)$ and $w_{cmplxBPF}(p)$, where $p \in [-L,L]$, represent complex coefficients of the two filters; * denotes the complex conjugate of a complex signal; and N denotes the number of subcarriers.

In this embodiment, one of the two filters is a low pass filter (LPF) while the other of the two filters is a band pass filter (BPF). The filtering bandwidth of the band pass filter (BPF) is variable.

In this embodiment, the method further comprises the step of performing a compensation operation for the k'th subcarrier of the l'th OFDM symbol by using the estimated channel impulse response.

In another aspect of the invention, a method for equalizing channels comprises the steps of: estimating temporary (preliminary) channel impulse responses for all subcarriers by using at least two filters; selecting a subcarrier corresponding with the largest one among the preliminary channel impulse responses for all the subcarriers; establishing a bandwidth, that corresponds to the selected subcarrier, as the filtering bandwidth of one of the two filters; and estimating channel impulse responses for all subcarriers by using the two filters.

In this embodiment, in the step of estimating the preliminary channel impulse responses, a channel impulse response for a k'th subcarrier of an l'th OFDM symbol is given by:

$$CIR_{l,est}(k) = \sum_{p=-L}^{L} \hat{R}_l(k+p|(k+p) \in P_{SP}) \cdot$$

$$(w^*_{cmplxLPF}(p) + w^*_{cmplxBPF}(p) \cdot e^{-j2\pi nk/N}),$$

where: $\hat{R}_l(k|k \in P_{SP})$ represents samples of the channel impulse response (in the frequency domain) for the k'th subcarrier of the l'th OFDM symbol; $w_{cmplxLPF}(p)$ and $w_{cmplxBPF}(p)$, where $p \in [-L,L]$, represent complex coefficients of the two filters; * denotes the complex conjugate of a complex signal; and N denotes the number of subcarriers.

In this embodiment, when the subcarrier corresponding to the largest preliminary channel impulse response among the plurality of preliminary channel impulse responses is a k l'th subcarrier, in the step of estimating the channel impulse responses, a channel impulse response for a k'th subcarrier of an l'th OFDM symbol is given by:

$$CIR_{l,est}(k) = \sum_{p=-L}^{L} \hat{R}_l(k+p|(k+p) \in P_{SP}) \cdot$$

$$(w^*_{cmplxLPF}(p) + w^*_{cmplxBPF}(p) \cdot e^{-j2\pi nk/N}),$$

where: $\hat{R}_l(k|k \in P_{SP})$ represents samples of the channel impulse response (in the frequency domain) for the k'th subcarrier of the l'th OFDM symbol; $w_{cmplxLPF}(p)$ and $w_{cmplxBPF}(p)$, where $p \in [-L,L]$, represent complex coefficients of the two filters; * denotes the complex conjugate of a complex signal; and N denotes the number of subcarriers.

In still another aspect of the invention, a method for equalizing channels comprises the steps of: receiving OFDM symbols; generating channel impulse responses in the frequency domain for specific subcarriers of the OFDM symbols; estimating preliminary channel impulse responses for all subcarriers of the OFDM symbols by using a low pass filter (LPF) and at least one band pass filter (BPF); selecting a subcarrier corresponding with the largest preliminary channel impulse responses among all the subcarriers; establishing a bandwidth corresponding to the selected subcarrier as a filtering bandwidth of the at least one band pass filter (BPF); and estimating channel impulse responses for all subcarriers by using the low pass filter (LPF) and the at least one band pass filter (BPF).

In an alternative embodiment using two band pass filters (BPF1 & BPF2) and one low pass filter (LPF), the method comprises the steps of: selecting the subcarriers corresponding with the first and second largest responses among the preliminary channel impulse responses for all the subcarriers; establishing bandwidths, corresponding to the selected subcarriers, as filtering bandwidths of the two band pass filters; and estimating channel impulse responses for all subcarriers by using the one low pass filter (LPF) and the two band pass filters (BPF1 & BPF2).

In this alternative embodiment, the filtering bandwidth of at least one of the band pass filters (BPF1 or BPF2) is established corresponding with a guard interval.

In this alternative embodiment, a central frequency of at least one of the band pass filters is controlled by $e^{-j2\pi nk/N}$, where k denotes an ordering number of the subcarrier and N denotes the number of subcarriers.

Embodiments of the invention also provide a channel equalizer comprising: a time-domain interpolator configured to receive OFDM symbols and to generate channel impulse responses in the frequency domain for specific subcarriers of the OFDM symbols; a frequency-domain interpolator configured to receive samples of the channel impulse responses from the time-domain interpolator and to estimate channel impulse responses for all subcarriers by using at least two filters; and a compensator configured to perform a compensation operation for the OFDM symbols through the channel estimation by using the frequency-domain interpolator.

In this embodiment, one of the two filters is a low pass filter (LPF) while the other one of the two filters is a band pass filter (BPF).

In this embodiment, a filtering bandwidth of the band pass filter corresponds to a subcarrier having the largest estimated pattern of a channel impulse response among all the subcarriers.

Other aspects of the invention provide a channel equalizer comprising: a time-domain interpolator configured to receive a k'th subcarrier of an l'th OFDM symbol and to generate channel impulse responses for specific subcarriers in the frequency domain; a frequency-domain interpolator including at least two filters, configured to receive the channel impulse responses from the time-domain interpolator, and to estimate channel impulse responses for all subcarriers by using at least the two filters; and a compensator configured to perform a compensation operation for the k'th subcarrier of the l'th OFDM symbol through the channel impulse response generated by the frequency-domain interpolator.

In this embodiment, a channel impulse response for a k'th subcarrier of an l'th OFDM symbol is given by:

$$CIR_{l,est}(k) = \sum_{p=-L}^{L} \hat{R}_l(k+p|(k+p) \in P_{SP})) \cdot$$

$$(w^*_{cmplxLPF}(p) + w^*_{cmplxBPF}(p) \cdot e^{-j2\pi nk/N}),$$

where: $\hat{R}_l(k|k \in P_{SP})$ represents samples of the channel impulse response for the k'th subcarrier of the l'th OFDM symbol; $w_{cmplxLPF}(p)$ and $w_{cmplxBPF}(p)$, where $p \in [-L,L]$, represent complex coefficients in the frequency domain of the two filters; * denotes the complex conjugate of a complex signal; and N denotes the number of subcarriers.

In this embodiment, one of the two filters is a low pass filter (LPF) while the other of the two filters is a band pass filter (BPF).

In this embodiment, a filtering bandwidth of the band pass filter (BPF) is variable.

The frequency-domain interpolator employed in the OFDM receiver according to the present invention is configured to obtain estimated channel impulse responses by way of combination with a complex low pass filter (LPF) and an adaptive complex (BPF) within a transform domain. The OFDM receiver includes one or more filters, in which a filtering bandwidth of each BPF is variable. It is possible to improve the accuracy of channel estimation for frequency-domain interpolation by modifying the number of the BPFs and bandwidths thereof with consideration of the communication environment.

BRIEF DESCRIPTION OF THE FIGURES

Preferred embodiments of the invention will be described below in more detail with reference to the accompanying drawings. The invention may, however, be embodied in different forms and should not be constructed as limited to the exemplary embodiments set forth herein. Rather, these exemplary embodiments are provided so that this disclosure will be thorough and complete, and will fully convey the scope of the invention to those skilled in the art. In the figures, like reference numerals refer to like parts throughout the various figures unless otherwise specified, and.

DETAILED DESCRIPTION OF PREFERRED EMBODIMENTS

Figure 1:
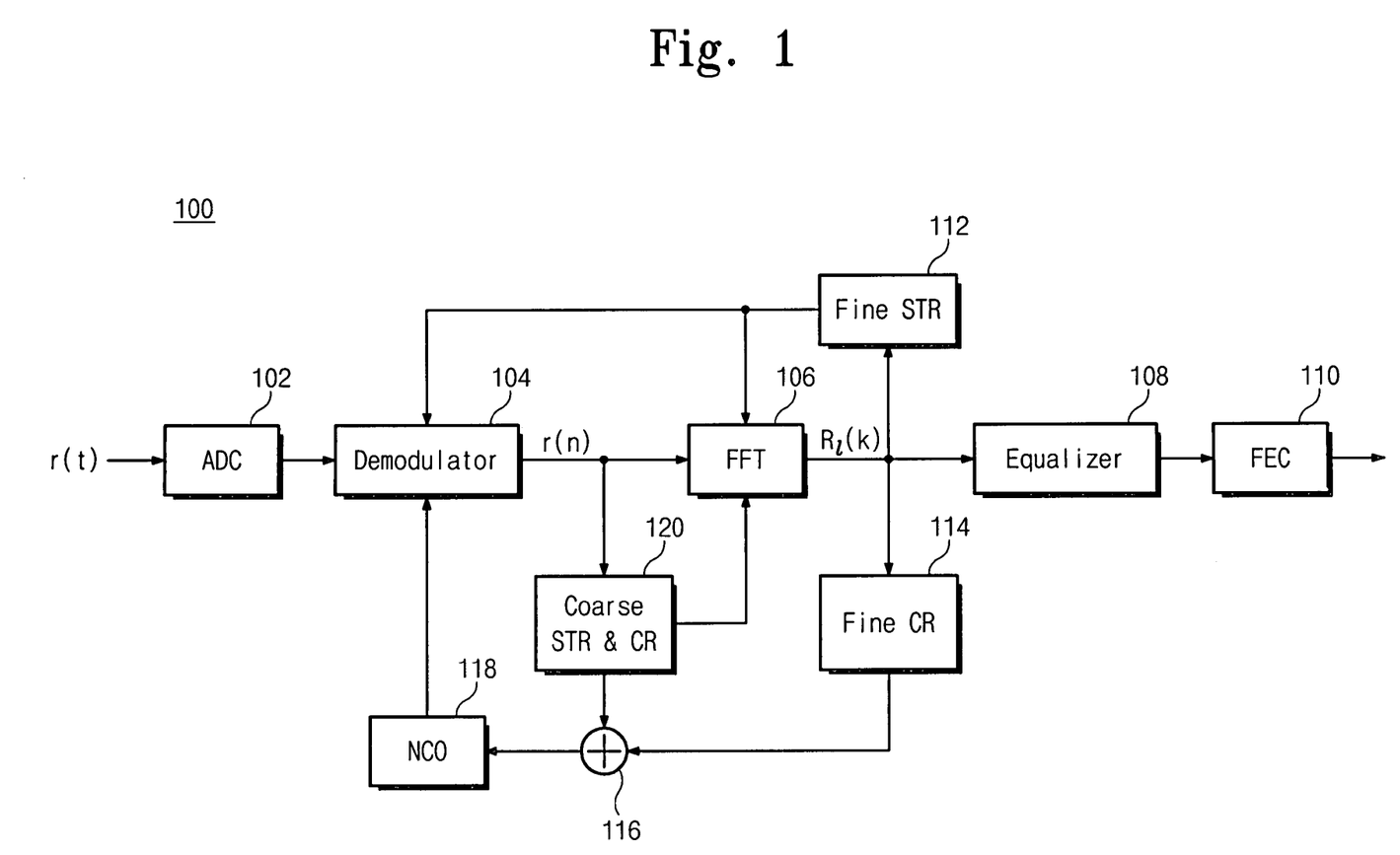
FIG. 1 is a block diagram of a digital video broadcasting television (DVB-T) receiver in accordance with an embodiment of the present invention.

FIG. 1 is a block diagram of a digital video broadcasting television (DVB-T) receiver in accordance with an exemplary embodiment of the present invention. Referring to FIG. 1, the DVB-T receiver 100 comprises an analog-to-digital converter (ADC) 102, a demodulator 104, a fast Fourier transformer (FFT) 106, an equalizer 108, a forward error control (FEC) block 110, a fine symbol timing recovery (STR) block 112, a fine carrier recovery (CR) block 114, an adder 116, a number controlled oscillator (NCO) 118, and a coarse STR/CR (symbol timing recovery/carrier recovery) block 120.

A DVB-T signal accepted by the DVB-T receiver 100 through an antenna (not shown) is a radio frequency (RF) signal, and is converted into an intermediate frequency (IF) signal (analog signal r(t)), and then is applied to the ADC 102. The analog signal r(t) is sampled in a fixed sampling frequency by the ADC 102. A digital signal output from the ADC 102 is applied to the demodulator 104. A sampled (digital) signal r(n), i.e., a baseband-sampled complex signal, is output from the demodulator 104.

The demodulator 104 is controlled directly by (feedback from) the fine STR block 112 and the NCO block 118, to generate the baseband-sampled complex signal r(n). The complex signal r(n) has a sampling frequency fs, where $fs=1/Ts$, and n denotes the n'th sample time. Here, $Ts=Tu/N_{FFT}$, where $Tu$ and $N_{FFT}$ represent a period of an OFDM symbol and a dimension of fast Fourier transform, respectively. The complex signal r(n) output from the demodulator 105 is applied to the coarse STR/CR block 120 and to the FFT 106.

The coarse STR/CR block 120 removes an OFDM guard interval GI from the complex signal r(n), generating a coarse starting point (indicating the location of an IFDM symbol) of the FFT 106. The coarse STR/CR block 120 also generates coarse carrier frequency offset information for the adder 116 that controls the NCO 118.

The FFT 106 generates a frequency-domain complex signal $R_l(k)$ that represents the k'th subcarrier of a first OFDM symbol. The FFT starting point is regulated by the coarse STR/CR block 120 and the fine STR 112.

The frequency-domain complex signal $R_l(k)$ (for each of the k'th subcarriers of a first OFDM symbol) is applied to the fine STR block 112, the fine CR block 114, and the equalizer 108. The fine CR block 114 generates and applies a carrier frequency offset signal to the adder 116. The adder 116 provides the NCO block 118 with a sum of the carrier frequency offset signal from the fine CR block 114 and of the coarse carrier frequency offset information from the coarse STR/CR block 120. The NCO block 118 generates a carrier frequency from the combined carrier frequency offset signal. The carrier output from the NCO block 118 is applied to the demodulator 104. The fine STR block 112 removes the guard interval GI from the complex signal r(n) so as to generate a precise FFT starting-point offset signal (defining the period of a OFDM symbol). The fine STR block 112 also generates a sampling frequency offset signal for the demodulator 104 in order to compensate a sampling frequency offset originated from the ADC 102. The equalizer 108 performs channel estimation and compensation. A compensated signal generated by the equalizer 108 is applied to the FEC block 110 configured to perform a Viterbi decoding operation thereupon.

Figure 2:
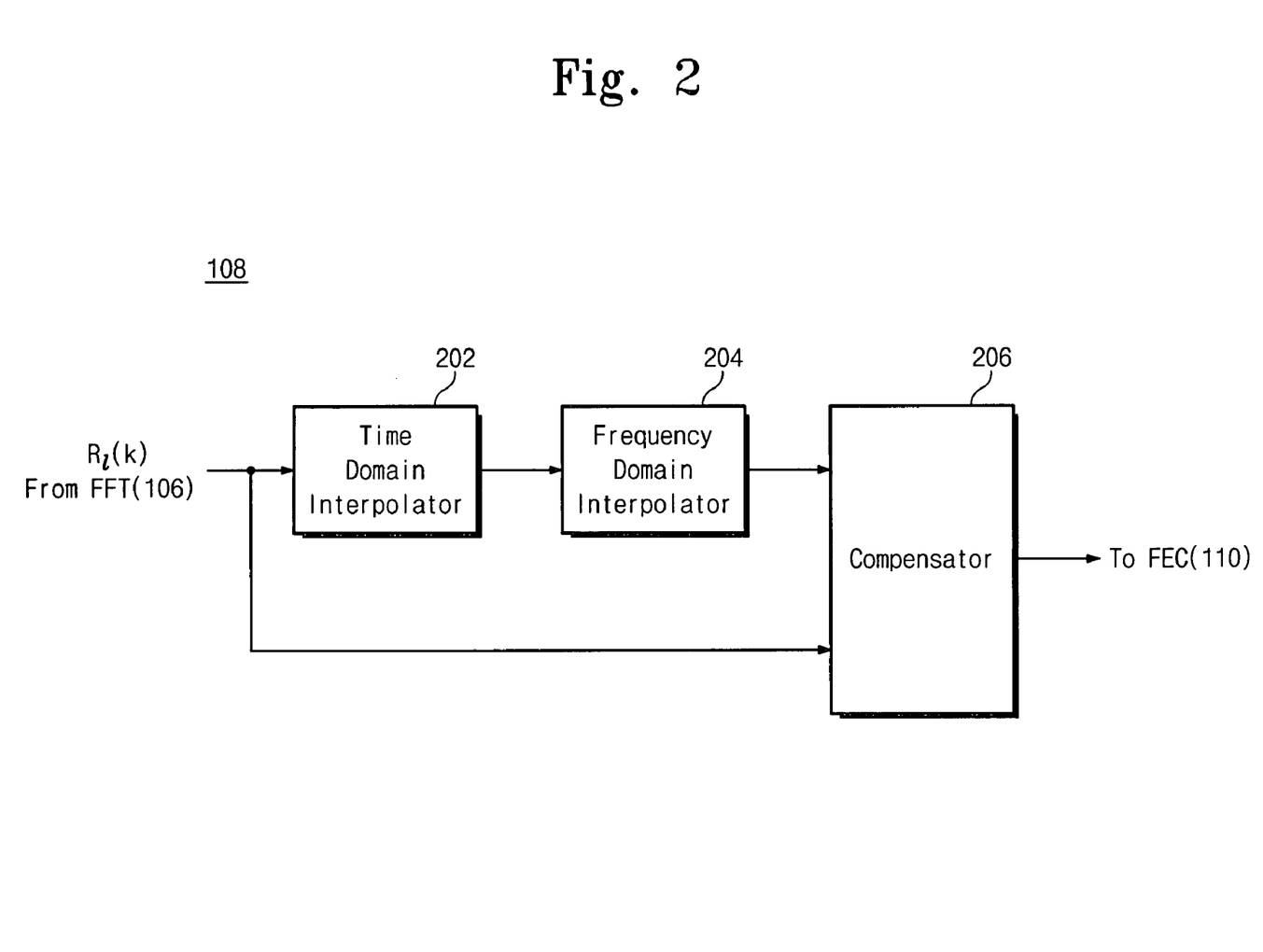
FIG. 2 is a block diagram of an equalizer 108 employed in the DVB-T receiver of FIG. 1.

FIG. 2 is a block diagram of an equalizer 108 employed in the DVB-T receiver of FIG. 1. As shown in FIG. 2, the equalizer 108 comprises a time-domain interpolator 202, a frequency-domain interpolator 204, and a compensation circuit 208.

According to the DVB-T standard, scattered pilots (pilot subcarriers) for plurality of OFDM symbols, $\{R_l(k), k \in [K_{min}, K_{max}]\}$, are interpolated to generate samples of channel impulse response (CIR) in the frequency domain.

Figure 3A:
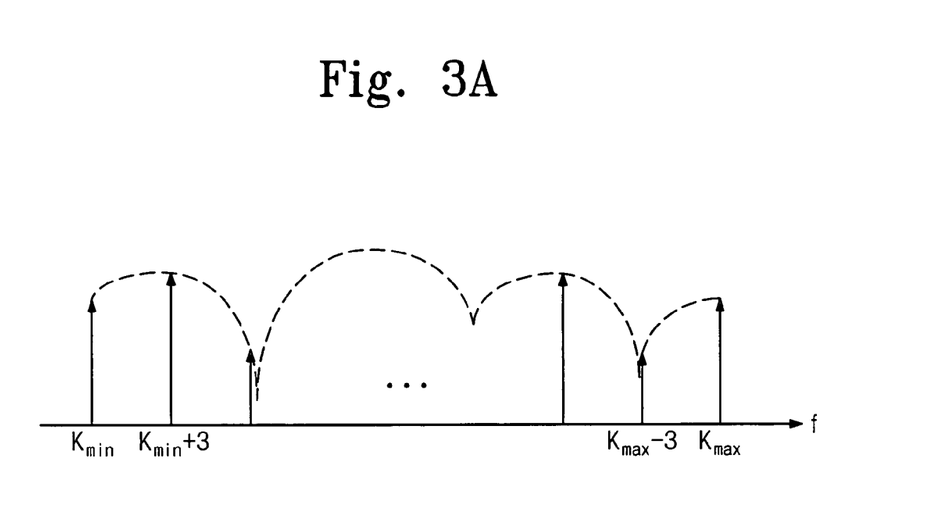
FIG. 3A is a graph depicting CIR samples output from the time-domain interpolator 202 shown in FIG. 2.
Figure 3B:
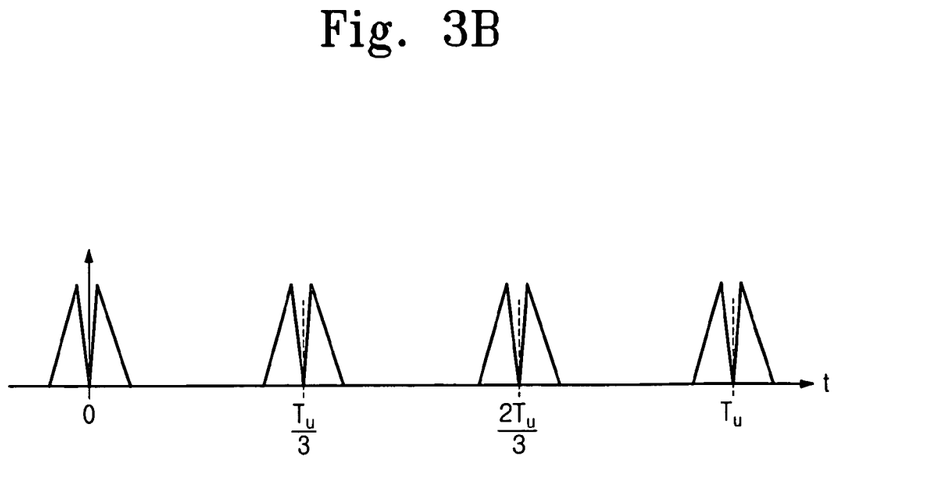
FIG. 3B is a graphic depicting real CIR patterns output from the time-domain interpolator 202 shown in FIG. 2.
Figure 3C:
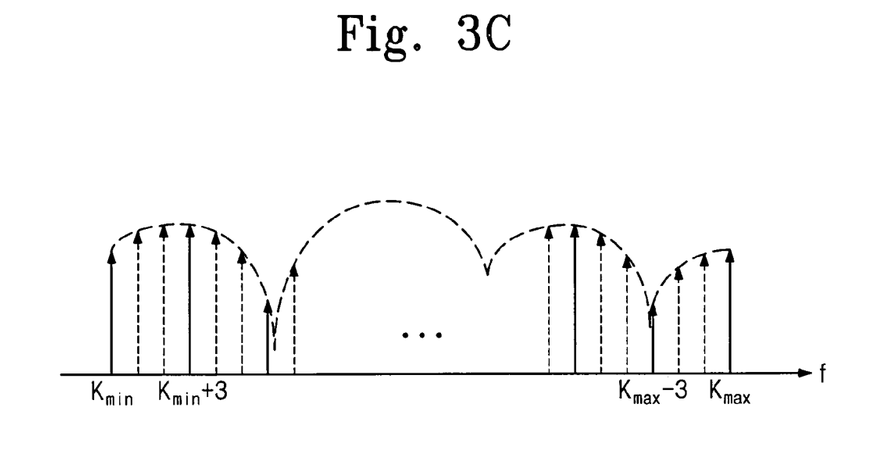
FIG. 3C is a graph depicting CIR patterns estimated by the frequency-domain interpolator 204 shown in FIG. 2.
Figure 3D:
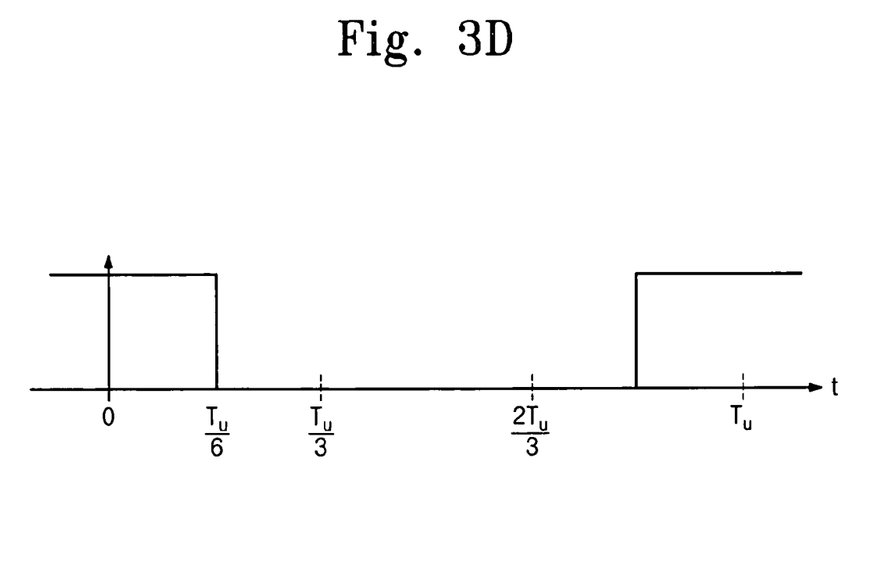
FIG. 3D is a graph depicting a filtering bandwidth of a real low pass filter.

Also according to the DVB-T standard, one sample of the CIR in the frequency domain may be obtained by the time-domain interpolator 202 every three subcarriers. The CIR samples generated from the time-domain interpolator 901 are shown in FIG. 3A, and real CIR patterns in a transform (time) domain after time-domain interpolation based on the interpolation theorem are shown in FIG. 3B. Meanwhile, FIG. 3D depicts a filtering bandwidth (in the frequency domain) of a real low pass filter (LPF). And, FIG. 3C illustrates estimated CIR patterns (in the time domain) corresponding to each of the subcarriers, being generated by multiplying the real CIR patterns of FIG. 3B by the real LPF defined as shown in FIG. 3D. The values of the real and imaginary CIR patterns for a k'th subcarrier of an l'th OFDM symbol, being estimated by the frequency-domain interpolator 204, are given by the following Equations 1 and 2:

$$\text{real}\{CIR_{l,est}(k)\} = \sum_{p=-L}^{L} \text{real}\{\hat{R}_l(k+p) | (k+p) \in P_{SP}\} \cdot w_{real}(p) \quad \text{[Equation 1]}$$

$$\text{imag}\{CIR_{l,est}(k)\} = \sum_{p=-L}^{L} \text{imag}\{\hat{R}_l(k+p) | (k+p) \in P_{SP}\} \cdot w_{real}(p) \quad \text{[Equation 2]}$$

In Equations 1 and 2, $\hat{R}_l(p|p \in P_{SP})$ represents the estimated CIR (for the k'th subcarrier of the l'th OFDM symbol) after completing the time-domain interpolation, and $P_{SP}$ represents a set of subcarrier index for CIR previously generated by the time-domain interpolation; And $w_{real}(p)$, where $p \in [-L,L]$, represents a real coefficient in the frequency domain of the real LPF (shown in the transform (time) domain in FIG. 3D).

Therefore, the CIR patterns for all subcarriers are obtained by the frequency-domain interpolator 204 after completing the interpolation, and then input to a compensator 206 (FIG. 2). The compensator 206 receives the CIR values from the frequency-domain interpolator 204 and performs a compensation operation for each $R_l(k)$ that is supplied from the FFT 106.

As illustrated in FIG. 3B, the maximum bandwidth of the imaginary CIR after completing the time-domain interpolation, (i.e., the maximum delay time of an echo in a multi-path channel), is $$\frac{T_U/3}{2} = \frac{T_U}{6}$$

based on the Nyquist sampling theorem.

Figure 4:
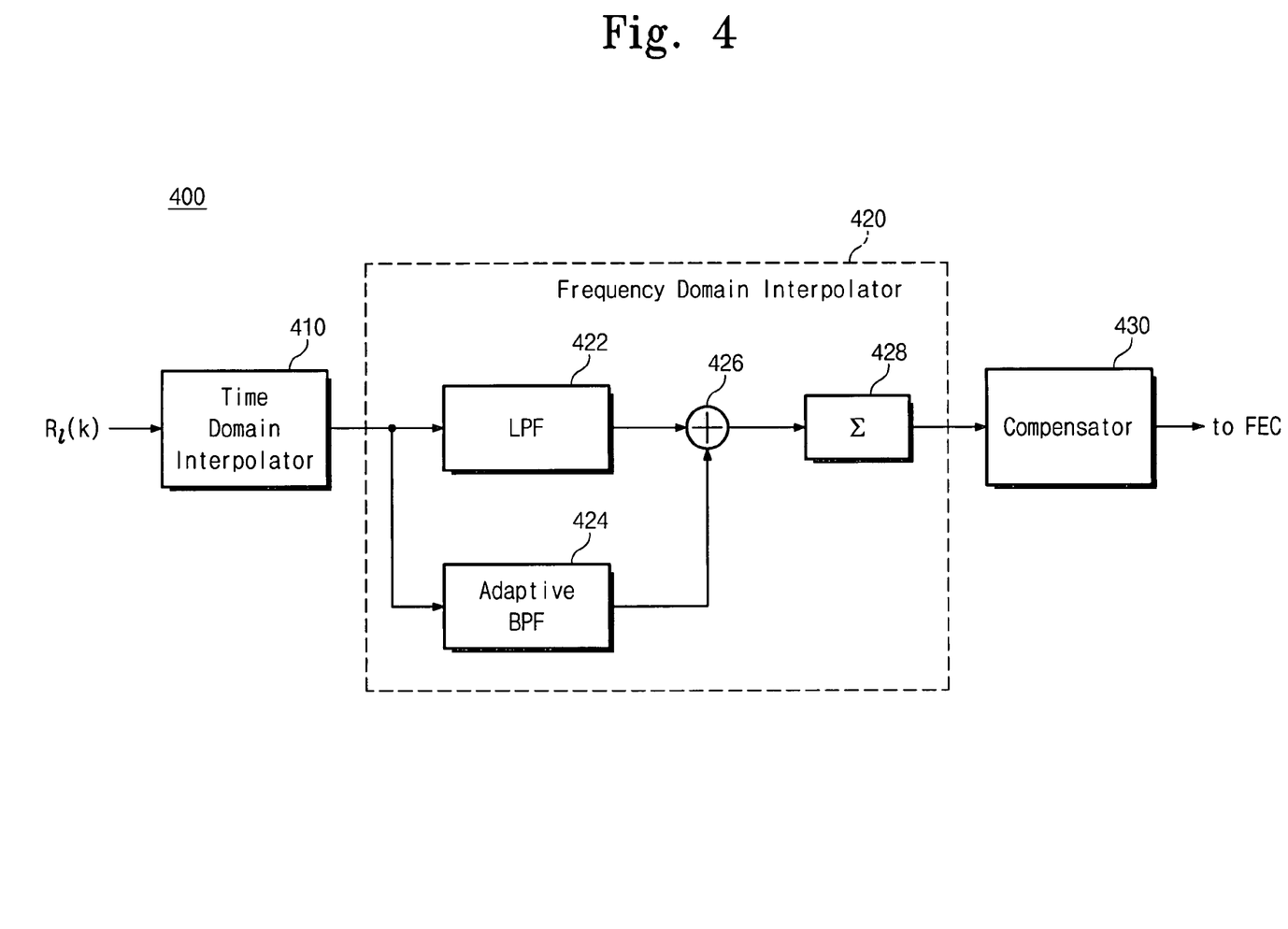
FIG. 4 is a block diagram of an equalizer in accordance with a another preferred embodiment of the invention, for use in place of the frequency-domain interpolator 204 shown in FIG. 2.

FIG. 4 is a block diagram illustrating an equalizer 400 in accordance with another preferred embodiment of the invention, for use in place of the frequency-domain interpolator 204 shown in FIG. 2. The equalizer 400 comprises a time-domain interpolator 410, a frequency-domain interpolator 420, and a compensator 430. The frequency-domain interpolator 420 includes a complex pass filter (LPF) 422, an adaptive complex band pass filter (BPF) 424, an adder 426, and a summing unit (accumulator) 428.

Figure 5A:
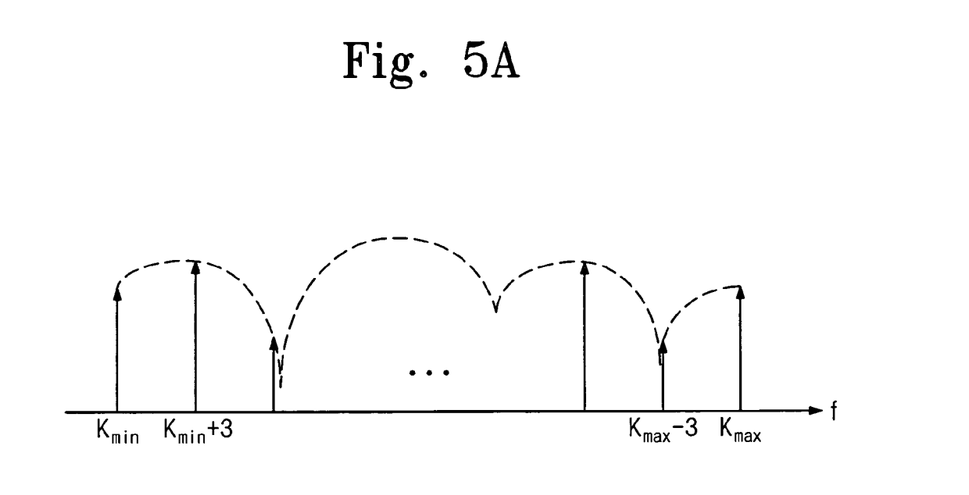
FIG. 5A is a graph depicting samples of CIR estimation output from the time-domain interpolator 410 shown in FIG. 4.
Figure 5B:
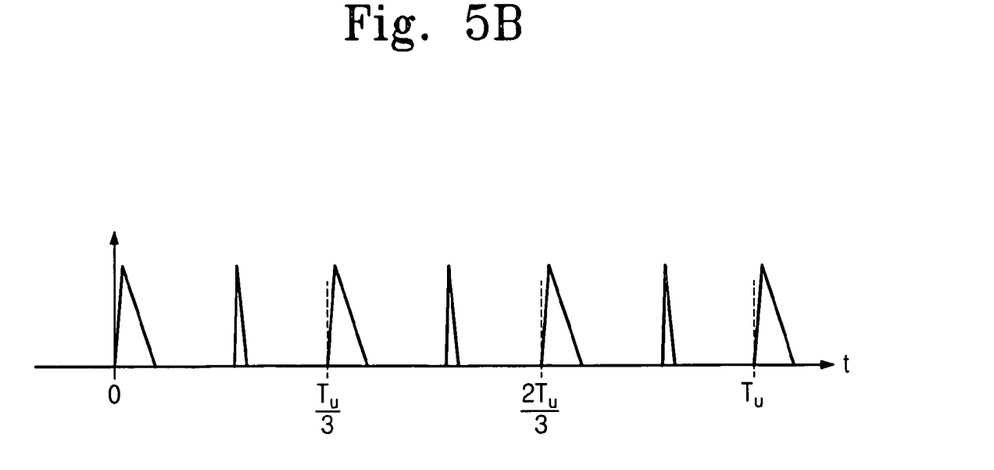
FIG. 5B is a graph depicting real parts of the complex CIR patterns after time domain interpolation.

FIG. 5A depicts samples of CIR after completing time-domain interpolation; FIG. 5B depicts complex CIR patterns output from the time-domain interpolator 410 shown in FIG. 4. There is a time delay in a practical multi-path channel, (and imaginary components do not exist in the transform (time) domain after completing the time-domain interpolation); and thus real components of the complex CIR patterns are shown in FIG. 5B.

Returning to FIG. 4, the complex CIR output from the time-domain interpolator 410 is applied to the complex LPF 422 and to the adaptive complex BPF 424. Signals output from the LPF and BPF filters 422 and 424 are summed up by the adder 426 and are accumulated by the summing unit 428. With the frequency-domain interpolator 420 according to the present invention, the value of each estimated CIR is given by:

$$CIR_{l,est}(k) = \sum_{p=-L}^{L} \hat{R}_l(k+p|(k+p) \in P_{SP}) \cdot$$
$$(w^*_{cmplxLPF}(p) + w^*_{cmplxBPF}(p) \cdot e^{-j2\pi nk/N})$$

[Equation 3]

Equation 3, $CIR_{l,est}(k)$ denotes the estimated CIR for a k'th subcarrier of an l'th OFDM symbol, which is obtained after completing frequency-domain interpolation; $\hat{R}_l(k|k \in P_{SP})$ represents the estimated CIR after completing the time-domain interpolation for the k'th subcarrier of the l'th OFDM symbol; and $P_{SP}$ represents a set of subcarrier index for CIR previously generated by way of the time-domain interpolation. The items $w_{cmplxLPF}(p)$ and $w_{cmplxBPF}(p)$, where $p \in [-L, L]$, respectively represent complex coefficients of the complex LPF 422 and the adaptive complex BPF 424 in the frequency domain shown in FIG. 5C. The sign * denotes the complex conjugate of a complex signal, while the character N denotes the number of subcarriers.

Figure 5C:
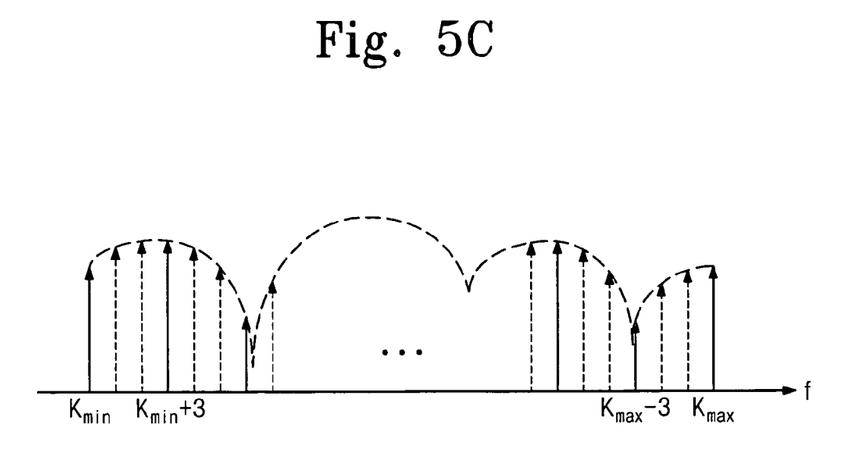
FIG. 5C is a graph depicting CIR estimation output from the frequency domain interpolator 420 shown in FIG. 4.
Figure 5D:
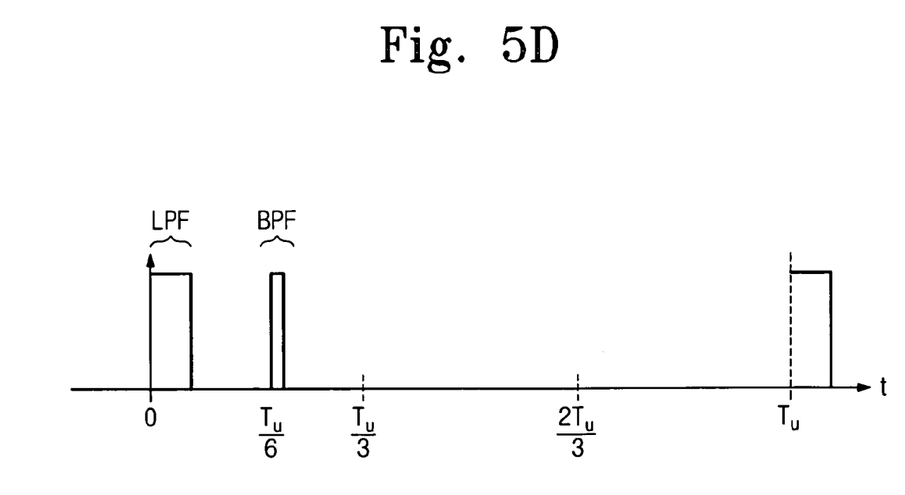
FIG. 5D is a graph depicting filtering bandwidths of a complex low pass filter and adaptive complex band pass filter.

FIG. 5C is a graph depicting CIR estimation output from the frequency domain interpolator 420 shown in FIG. 4. The CIR estimation for all subcarriers is generated by the combination (426 and 428) of the complex low pass filter 422 and the adaptive complex band pass filter 424. FIG. 5D is a graph depicting filtering bandwidths of the complex low pass filter 422 and the adaptive complex band pass filter 424.

As illustrated in FIG. 5D, the theoretical maximum bandwidth of the complex LPF 422 permissible in the frequency-domain interpolator 204, is Tu/3. However, such a wide bandwidth of the complex LPF 422 may contain much noise power therein, incurring degradation of the CIR estimation performance in the frequency-domain interpolator 204 shown in FIG. 2. Furthermore, if the complex CIR value output from the time-domain interpolator 410 is positioned (shifted) out of the profile of the complex LPF for the frequency-domain interpolation, it seriously deteriorates the performance due to distortion of CIR estimation after the frequency-domain interpolation. Thus, preferably, the present invention may be configured to provide the adaptive complex BPF 424 in the frequency-domain interpolator 420 in addition to the complex LPF 422.

The adaptive complex BPF 424 is operable with a filtering bandwidth dependent upon the factor k in $e^{-j2\pi nk/N}$ of Equation 3. In the practical environment of a multi-path channel, it is difficult to properly estimate the complex CIR patterns, (as shown in FIG. 5B), which are obtained after the time-domain interpolation. In other words, it is desirable that the filtering bandwidth of the adaptive complex BPF 424 is to be modified in accordance with the practical environment of multi-path channel.

Figure 6:
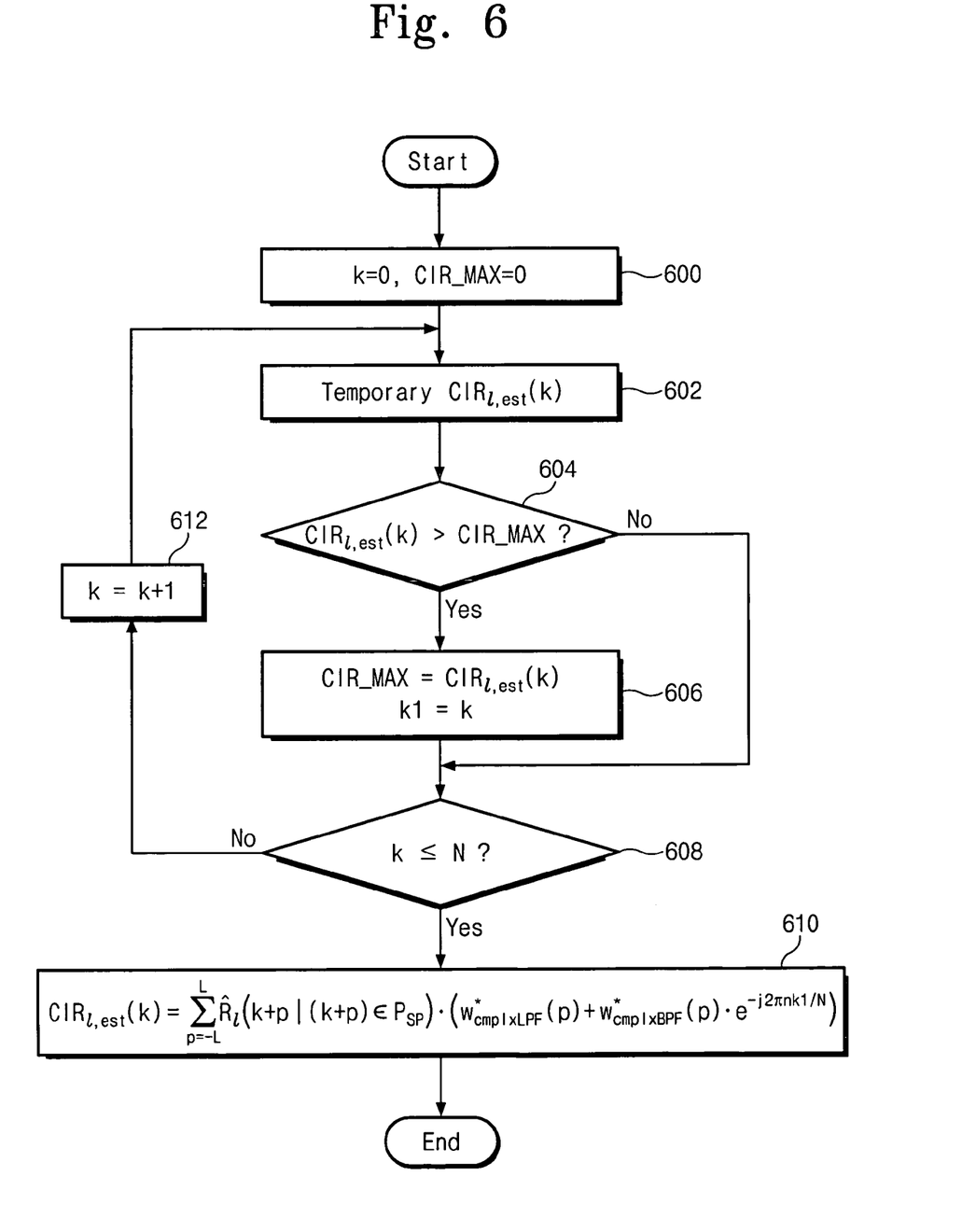
FIG. 6 is a flow chart illustrating a method of deciding a filtering bandwidth of the adaptive complex band pass filter for channel estimation in accordance with a preferred embodiment of the invention.

FIG. 6 is a flow chart showing a method of constructing (deciding) a filtering bandwidth of the adaptive complex BPF 424 for channel estimation in accordance with a preferred embodiment of the invention.

First, in step 600, initialization for the adaptive complex BPF 424 (FIG. 4) is carried out by which the values of k and CIR_MAX are set on 0. As aforementioned, k denotes a position of a subcarrier of the l'th OFDM symbol.

Next, in step 602 the estimated CIR value $CIR_{l,est}(k)$ is calculated by using Equation 3. If in decision step 604, it is determined that the estimated CIR value $CIR_{l,est}(k)$ is larger than the maximum value CIR_MAX, then in alternate step 606 the maximum value CIR_MAX is set to $CIR_{l,est}(k)$ while k1 is set as k (step 606).

If in decision step 608, it is determined that k is not more than N. i.e., k≦N, then in alternative step 612, the value of k is increased (incremented) by 1 (step 612) and the method returns to perform the step 602. Otherwise, if in decision step 608, it is determined that k is larger than N. i.e., k>N, the procedure goes to final step 610 in which the filtering bandwidth of the adaptive complex BPF 424 is established with the k1'th subcarrier of the l'th OFDM symbol. Specifically, using Equation 3 for calculating a value of $CIR_{l,est}(k)$ the item $e^{-j2\pi nk/N}$ to determine the filtering bandwidth of the adaptive complex BPF 424 is set to $e^{-j2\pi nk1/N}$.

According to the method of constructing (deciding) the filtering bandwidth of the adaptive complex BPF 424, the value of k associated with the maximum of the estimated CIR while changing k from 0 to N) is obtained, and then the filtering bandwidth of the adaptive complex BPF 424 is set on a bandwidth that corresponds to the obtained value of k.

Therefore, the filtering bandwidth of the complex LPF 422 may be constructed smaller than Tu/3, and the CIR samples positioned out of the profile of the complex LPF 422 can be obtained by the adaptive complex BPF 424. Thus, receivers according to embodiments of the invention are able to reduce the power of noises of the complex LPF 422 for channel estimation, improving the performance of CIR estimation through the frequency-domain interpolator 420.

Figure 7:
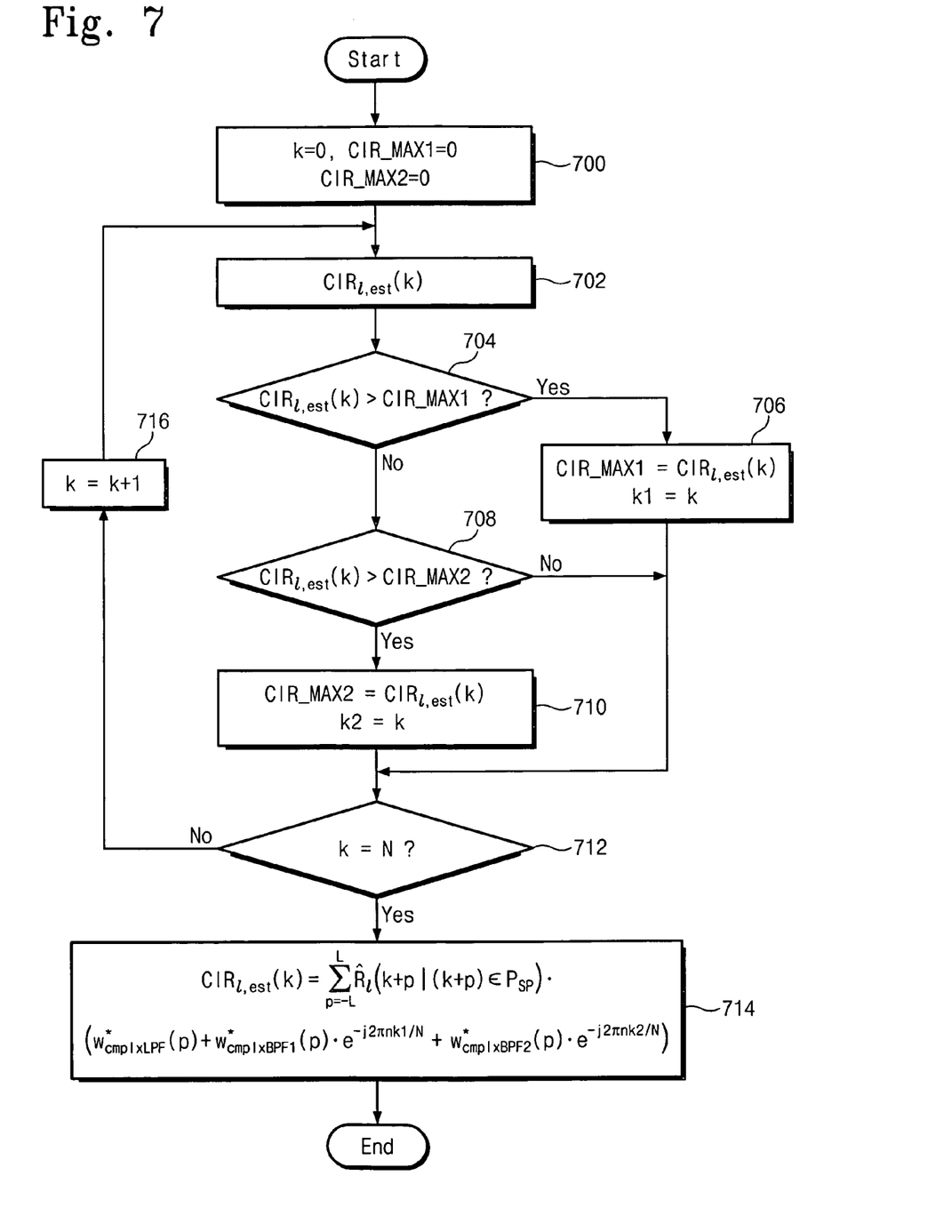
FIG. 7 is a flow chart illustrating a method of deciding filtering bandwidths of two adaptive complex band pass filters for channel estimation in accordance with another preferred embodiment of the invention.

FIG. 7 is a flow chart illustrating a method of constructing (deciding) filtering bandwidths of two adaptive complex BPFs for channel estimation in accordance with another preferred embodiment of the invention.

First, in step 700, initialization of the adaptive complex BPFs is carried out by which the values of k, CIR_MAX1, and CIR_MAX2 are set all to 0. As aforementioned, k denotes a position (index) of a subcarrier of the l'th OFDM symbol.

Next, in step 702 the estimated CIR value $CIR_{l,est}(k)$ is calculated by using Equation 3. If in decision step 704, the estimated CIR value $CIR_{l,est}(k)$ is determined as being larger than the first maximum value CIR_MAX, then in alternative step 706 the first maximum value CIR_MAX1 is set to $CIR_{l,est}(k)$ and k1 is set as k.

If in decision step 708, it is determined that the estimated CIR value $CIR_{l,est}(k)$ is larger than the second maximum value CIR_MAX2, then in alternative step 710 the second maximum value CIR_MAX2 is set to $CIR_{l,est}(k)$ and k2 is set as k.

If in decision step 712, it determined that k is not more than N, i.e., k≦N, the value of k increases (is incremented) by 1 and the procedure returns to the step 702. Otherwise, if in decision step 712, it is determined that k is larger than N, i.e., k>N, then the procedure goes to step 714 in which the filtering bandwidths of the two adaptive complex BPFs are established with the k1'th and k2'th subcarriers of the l'th OFDM symbol.

According to the aforementioned description by the invention, two filters are comprised within the frequency-domain interpolator and at least one of the filters is an adaptive BPF operable with a variable filtering bandwidth, and it is possible to construct (decide) the filtering bandwidths. This feature is helpful for adapting the DVB-T receiver in the multi-path channel environment. As a result, a receiver in accordance with embodiments of the invention is able to improve the performance of channel estimation therein, enhancing the equalizing function.

While there has been illustrated and described what are presently considered to be preferred exemplary embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the inventive concept disclosed herein. Therefore, it is intended that the present invention not be limited to the particular embodiments disclosed, but that the invention shall include all embodiments falling within the scope of the appended claims.

What is claimed is:

1. A method for equalizing channels, comprising the steps of:
generating channel impulse responses in the frequency domain for a plurality of subcarriers of received OFDM symbols;
filtering the channel impulse responses for the plurality of subcarriers by using at least two filters; and
estimating the channel impulse responses for the plurality of subcarriers from outputs of the two filters,
wherein one of the at least two filters is an adaptive band pass filter, and a filtering bandwidth of the adaptive band pass filter matches a subcarrier having the largest response among the channel impulse responses in the frequency domain.

2. The method as set forth in claim 1, wherein in the step of estimating the channel impulse responses, a channel impulse response for a k'th subcarrier of an l'th OFDM symbol is given by $$CIR_{l,est}(k) = \sum_{p=-L}^{L} \hat{R}_l(k+p|(k+p) \in P_{SP})\} \cdot$$

$$(w^*_{cmplxLPF}(p) + w^*_{cmplxBPF}(p) \cdot e^{-j2\pi nk/N}),$$

where: $\hat{R}_l(k|k \in P_{SP})$ represents samples of the channel impulse response for the k'th subcarrier of the l'th OFDM symbol; $w_{cmplxLPF}(p)$ and $w_{cmplxBPF}(p)$, where p∈[−L, L], represent complex coefficients of the two filters; * denotes the complex conjugate of a complex signal; and N denotes the number of subcarriers.

3. The method as set forth in claim 2, which further comprises the step of performing a compensation operation for the k'th subcarrier of the l'th OFDM symbol by using the estimated channel impulse response.

4. The method as set forth in claim 1, wherein one of the at least two filters is a low pass filter.

5. A method of equalizing channels, comprising the steps of:
estimating preliminary channel impulse responses for each of a plurality of subcarriers of an OFDM symbol by using at least two filters;
selecting a subcarrier corresponding with the largest response among the preliminary channel impulse responses;
establishing as the filtering bandwidth of one of the two filters, the bandwidth that corresponds to the selected subcarrier; and
estimating channel impulse responses for each of the plurality of subcarriers by using the two filters,
wherein one of the at least two filters is an adaptive band pass filter, and a filtering bandwidth of the adaptive band pass filter matches the selected subcarrier.

6. The method as set forth in claim 5, wherein in the step of estimating the preliminary channel impulse responses, a channel impulse response for a k'th subcarrier of an l'th OFDM symbol is given by $$CIR_{l,est}(k) = \sum_{p=-L}^{L} \hat{R}_l(k+p|(k+p) \in P_{SP})\} \cdot$$

$$(w^*_{cmplxLPF}(p) + w^*_{cmplxBPF}(p) \cdot e^{-j2\pi nk/N}),$$

where: $\hat{R}_l(k|k \in P_{SP})$ represents samples of the channel impulse response for the k'th subcarrier of the l'th OFDM symbol; $w_{cmplxLPF}(p)$ and $w_{cmplxBPF}(p)$, where p∈[−L,L], represent complex coefficients in the frequency domain of the two filters; * denotes the conjugate of a complex signal; and N denotes the number of subcarriers.

7. The method as set forth in claim 5, wherein, when the subcarrier corresponding to the largest one among the preliminary channel impulse responses is a k1'th subcarrier, in the step of estimating the channel impulse responses, a channel impulse response for a k'th subcarrier of an l'th OFDM symbol is given by $$CIR_{l,est}(k) = \sum_{p=-L}^{L} \hat{R}_l(k+p|(k+p) \in P_{SP})\} \cdot$$

$$(w^*_{cmplxLPF}(p) + w^*_{cmplxBPF}(p) \cdot e^{-j2\pi nk/N}),$$

where: $\hat{R}_l(k|k \in P_{SP})$ represents samples of the channel impulse response for the k'th subcarrier of the l'th OFDM symbol; $w_{cmplxLPF}(p)$ and $w_{cmplxBPF}(p)$, where p∈[−L,L], represent complex coefficients in the frequency domain of the two filters; * denotes the conjugate of a complex signal; and N denotes the number of subcarriers.

8. A method for equalizing channels, comprising the steps of:
    receiving OFDM symbols;
    generating channel impulse responses in the frequency domain for specific subcarriers of the OFDM symbols;
    estimating preliminary channel impulse responses for all subcarriers of the OFDM symbols by using a low pass filter and at least an adaptive band pass filter;
    selecting a subcarrier in correspondence with the largest one among the preliminary channel impulse responses for all the subcarriers;
    establishing as a filtering bandwidth of the adaptive band pass filter the bandwidth that matches the selected subcarrier; and
    estimating channel impulse responses for the plurality of subcarriers by using the low pass filter and the adaptive band pass filter.

9. The method as set forth in claim 8, wherein the number of adaptive band pass filters is two, further comprising the steps of:
    selecting the first and second subcarriers corresponding with the first and second largest responses among the preliminary channel impulse responses for the plurality of subcarriers;
    establishing as the filtering bandwidth of the first of the two adaptive band pass filters, the bandwidth corresponding to the first selected subcarrier; and
    estimating channel impulse responses for the plurality of subcarriers by using the low pass filter and the two adaptive band pass filters.

10. The method as set forth in claim 9, further comprising: establishing as the filtering bandwidth of the second of the two adaptive band pass filters, the bandwidth corresponding to the second selected subcarrier.

11. The method as set forth in claim 9, wherein the filtering bandwidth of at least one of the adaptive band pass filters is established corresponding with the guard interval between received OFDM symbols.

12. The method as set forth in claim 8, wherein a central frequency of at least one of the adaptive band pass filters is controlled by $e^{-j2\pi nk/N}$, wherein k denotes an index number of the subcarrier, and N denotes the number of subcarriers.

13. A channel equalizer comprising:
    a time-domain interpolator configured to receive OFDM symbols and to generate channel impulse responses in the frequency domain for a plurality of subcarriers of the received OFDM symbols;
    a frequency-domain interpolator configured to receive samples of the channel impulse responses from the time-domain interpolator and to estimate channel impulse responses for the subcarriers by using at least two filters; and
    a compensator configured to perform a compensation operation for the OFDM symbols though the channel estimation by using the frequency-domain interpolator,
    wherein one of the at least two filters is an adaptive band pass filter, and a filtering bandwidth of the adaptive band pass filter matches a subcarrier having the largest response among estimated channel impulse responses for the plurality of subcarriers.

14. A channel equalizer for an OFDM receiver, comprising:
    a time-domain interpolator to generate channel impulse responses in the frequency domain for a plurality of subcarriers;
    a frequency-domain interpolator including at least two filters to estimate channel impulse responses for the plurality of subcarriers by using the at least two filters; and
    a compensator,
    wherein one of the at least two filters is an adaptive band pass filter, and a filtering bandwidth of the adaptive band pass filter matches a subcarrier having the largest response among estimated channel impulse responses for a plurality of subcarriers of OFDM symbols received by the time-domain interpolator.

15. The channel equalizer as set forth in claim 14, wherein:
    the time-domain interpolator is configured to receive a k'th subcarrier of an l'th OFDM symbol;
    the frequency-domain interpolator is configured to receive the channel impulse responses from the time-domain interpolator; and
    the compensator is configured to perform a compensation operation for the k'th subcarrier of the l'th OFDM symbol using the channel impulse response generated by the frequency-domain interpolator.

* * * * *